Patented July 29, 1930

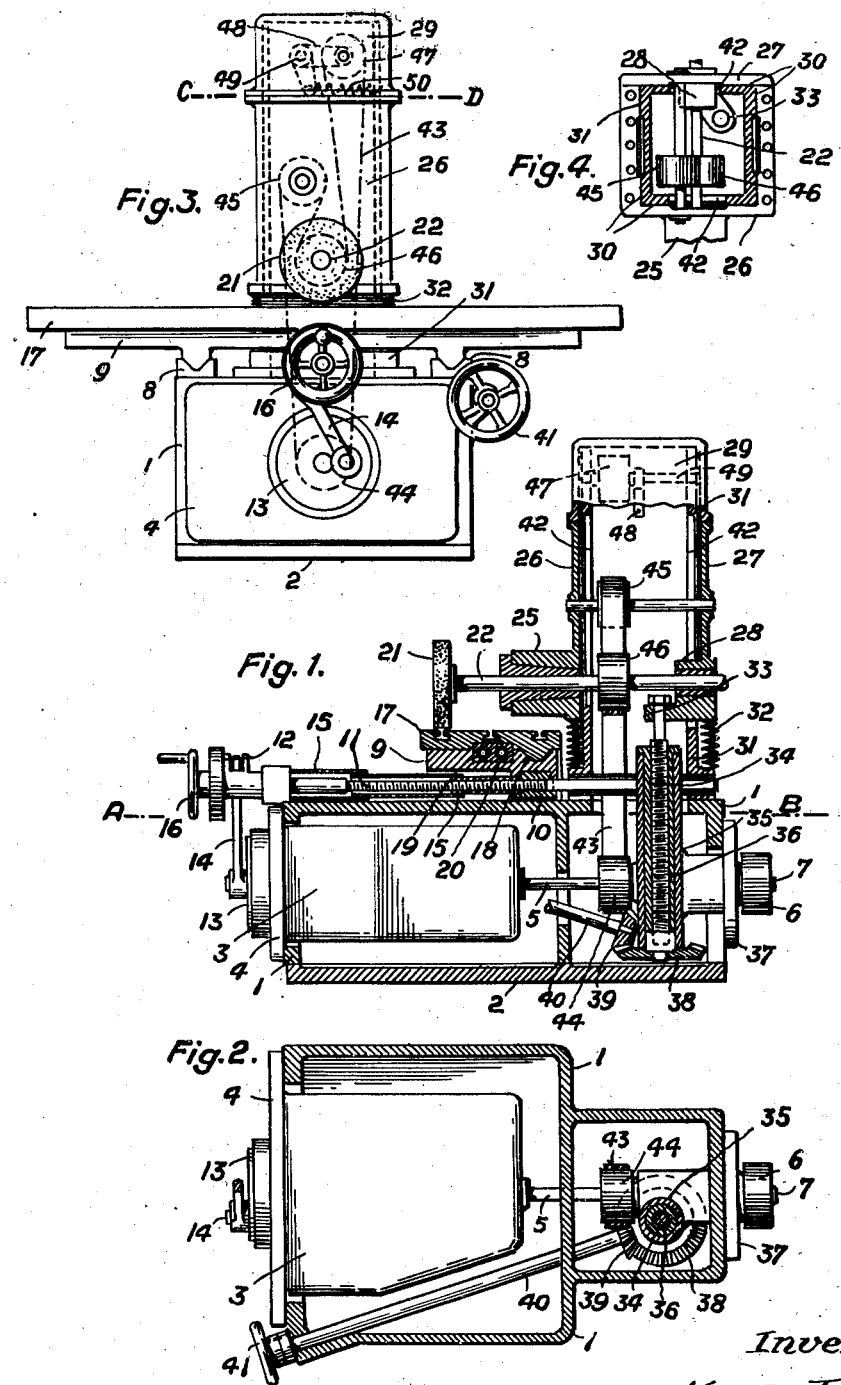

1,771,540

UNITED STATES PATENT OFFICE

KARL JUNG, OF BERLIN, GERMANY

MACHINE TOOL, PARTICULARLY A GRINDING MACHINE

Application filed April 27, 1927, Serial No. 187,029, and in Germany September 25, 1926.

In the hitherto known embodiments of machine tools, particularly grinding machines and similar precision working machines the disadvantage arises that on account of the open construction of the gear members for the longitudinal and transverse travel and the adjustment of the tool carrier in a vertical or horizontal direction, shavings and dust particles gain access into the machine and damage and very shortly destroy the parts engaged. This circumstance is observed to be particularly troublesome in the case of grinding machines.

According to the invention these disadvantages are obviated in that the gear members for the movement of the tool and work-piece and the guide for the tool carrier are completely enclosed externally, whereby means are provided by which upon movement or adjustment of the parts concerned a dust tight closure is ensured.

The accompanying drawing illustrates an example of one embodiment of the invention for a surface grinding machine in which:—

Figure 1 is a section through the machine,
Figure 2 a section on line A—B of Fig. 1,
Figure 3 is a front elevation, and
Figure 4 a section on line C—D of Fig. 3.

In the drawings 1 is the frame of the grinding machine which at the bottom is closed by a plate 2 and may be secured in any desired manner upon a bearing block, a work table or a foundation or the like. Within the frame is located a housing 3 enclosing the driving means for the longitudinal and transverse travel of the work-piece, and of which the securing flange 4 closes the frame 1 in the front. The operation of the longitudinal and transverse travel takes place in the present case in a hydraulic manner by toothed wheel pumps or the like, located in the housing 3, which are driven by a driving shaft 5 from the main shaft 7 of the machine carrying a driving pulley 6. Upon the frame 1 is located in known manner a sliding carriage 9 movable in guides in a transverse direction and in which a nut 10 is mounted through which a feed screw 11 penetrates. The feed screw 11 at its forward end carries a known catch device 12 or the like which is operated by a lever 14 coupled eccentrically to a disc 13 rotated hydraulically backwards and forwards about a definite angle. The catch device 12 operates in the manner that upon movement of the eccentric lever 14 the feed screw 11 is rotated a certain amount whereby the sliding carriage 9 is moved backwards and forwards in the transverse direction.

The feed screw 11 is enclosed by a number of tubes 15 telescopically arranged one within the other, which upon movement of the sliding carriage 9 either slide one within the other or are drawn apart. Upon the forward end of the feed screw 11 is mounted a hand wheel 16 which renders possible an adjustment of the sliding carriage 9 by hand.

Upon the sliding carriage 9 is located a slide 17, serving to receive the work piece and movable in the longitudinal direction, which is guided in a groove 18 of the sliding carriage 9 and by means of two hydraulic pistons 19 and 20 travel may be maintained in one or the other direction. Into the cylinders of the pistons 19 and 20 the pressure medium, for example, oil, is introduced, through passages not shown in the drawing, from the housing 3 of the hydraulic driving device.

Over the slide 17 is located a grinding disc 21, the spindle 22 of which is supported in the bearing shaped boss of a carrier 26 U-shaped in section. The open rear wall of the carrier 26 is closed tightly by a plate 27 screwed thereon, which is also provided with a boss 28 serving as a bearing for the guiding spindle 22. The space enclosed by the carrier 26 and the plate 27 is closed tightly overhead by a damper 29 set thereover. On the inner surfaces of the carrier 26 and the plate 27 guides are located which engage with correspondingly formed guides of a box-shaped standard 31 securely mounted upon the frame 1 of the machine. At the lower end of the carrier 26 and the plate 27 is secured a movable bellows 32 of which the other end is secured to the fixed standard 31 and ensures that in every position of the carrier 26 movable in a vertical direction a complete packing of the space enclosed by this externally.

The adjustment of the carrier 26 and therewith also the tool 21 takes place by means of a spindle 34, secured to a projection 33 of the guiding spindle bearing 28, which is mounted in a sleeve 36 provided with internal threads located in a bearing member 35. The bearing member 35 which at the same time serves as bearing for the driving shaft 7 is located within the frame 1 and fixed to the same by means of a flange 37. At the lower end of the sleeve 36 is located a bevel wheel 38 which is in engagement with a bevel wheel 39 which is secured to one end of an adjusting spindle 40. The adjusting spindle 40 extends through the inner region of the frame 1 towards the forward side of the machine and carries on its front end projecting out of the front surface of the frame a handwheel 41. By rotation of this handwheel 41 the spindle 34 and therewith the carrier 26 and the tool 21 may be thus adjusted in a vertical direction, whereby the guides 30 of the carrier 26 and the plate 27 fixed thereon slide lengthwise on the guides of the fixed standard 31 which, for the purpose of free movement of the tool spindle 22 extending therethrough, is provided with longitudinal slots 42 at the front and back side.

The drive for the grinding disc 21 is accomplished by means of a driving belt 43 from a belt pulley 44 located on the driving shaft 7 of the machine. The driving belt 43 is then led round a pulley 45 mounted in the carrier 26 and the plate 27 and then over a pulley 46 located on the tool spindle 22 to a pulley 47 located at the upper end of the fixed standard 31. The pulley 47 is located at the end of an arm of a bell crank lever 48 whose axis 49 is mounted in the standard 31 and which has a spring 50 secured to the other arm. By this arrangement it will be seen that upon every position of the tool spindle 22 the required length of belt is the same whereby inadmissible pulling tendencies eventually arising during adjustment are compensated for by the spring mounting of the pulley 47.

The invention of course is not limited to the example illustrated, it may be used in the same manner for other desired machine tools and altered in its constructional form according to the particular use to which it is to be applied and the requirements in question, thus for example instead of the withdrawable bellows a telescopic-shaped arrangement may serve, and other arrangements of the same kind. The nature of the invention resides in that the entire moving parts are completely enclosed in use and when out of use, in particular the drive for the longitudinal and transverse travel of the cross-support is located in a box closed on all sides so that the machine according to desire may be placed upon a work table, a foundation plate or the like and in every case the entrance of dust is prevented.

I claim:

1. A grinding machine for grinding flat surfaces comprising a frame; a standard mounted on said frame and having guides thereon; a rotating tool; means for moving said rotating tool arranged within said standard; and an adjustable carrier for said tool guided by the guides of the standard and enclosing said means.

2. A grinding machine for grinding flat surfaces comprising a frame; a sliding carriage mounted on said frame; a standard mounted on said frame and having guides thereon; a rotating tool; a plurality of parts for moving said rotating tool arranged within said standard; an adjustable carrier for said tool guided by the guides of the standard and enclosing the said moving parts; and means for operating said sliding carriage.

3. A grinding machine for grinding flat surfaces comprising a frame; a sliding carriage mounted on said frame; a standard securely mounted on said frame and having guides thereon; a carrier consisting of a U-shaped part and a plate having guides thereon cooperating with the guides on the standard; a tool rotatably mounted in said carrier and the plate; and means for adjusting the carrier and the plate to thereby adjust the tool.

4. A grinding machine for grinding flat surfaces comprising a frame; a sliding carriage mounted on said frame; a standard securely mounted on said frame and having guides thereon; a carrier having guides thereon cooperating with the guides on the standard and enclosing it; a tool rotatably mounted in said carrier; a plurality of parts for moving said rotating tool arranged within said standard; means for adjusting the carrier to thereby adjust the tool; and a damper arranged on the top of said carrier for enclosing the top of the standard.

5. A grinding machine for grinding flat surfaces comprising a frame; a sliding carriage mounted on said frame; a standard securely mounted on said frame and having guides thereon; a carrier having guides thereon cooperating with the guides on the standard and enclosing it; a tool rotatably mounted in said carrier; a plurality of parts for moving said rotating tool arranged within said standard; means for adjusting the carrier to thereby adjust the tool; and an extensible member arranged between the bottom of said carrier and the machine frame and being connected with these parts respectively, thereby covering and protecting the guides.

6. A grinding machine for grinding flat surfaces comprising a frame; a sliding carriage mounted on said frame; a standard securely mounted on said frame and having guides thereon; a carrier having guides thereon cooperating with the guides on the standard and enclosing it; a tool rotatably mounted in said carrier; parts for moving said rotating tool arranged within said standard; means for adjusting the carrier to thereby adjust the tool; a damper arranged on the top of said carrier for closing the top of the standard; and an extensible member arranged between the bottom of said carrier and the machine frame and being connected with these parts respectively, thereby covering and protecting the guides, said damper and extensible member forming parts of said carrier.

In testimony whereof I have affixed my signature.

KARL JUNG.